H. R. BRUNNER.
AIR PREHEATING DEVICE FOR FURNACES.
APPLICATION FILED JUNE 5, 1918.

1,430,936.

Patented Oct. 3, 1922.
5 SHEETS—SHEET 1.

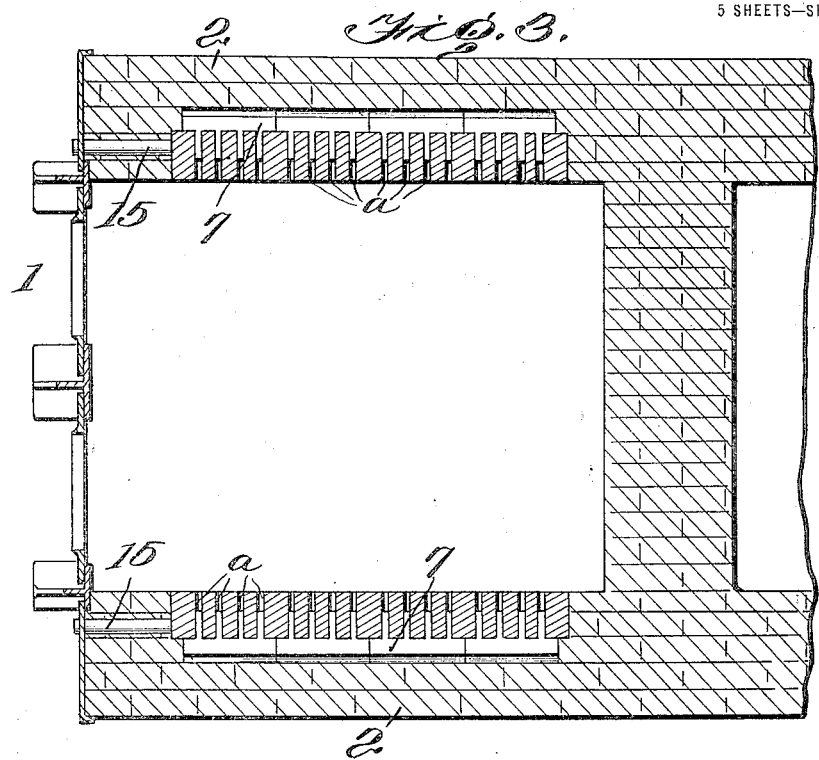
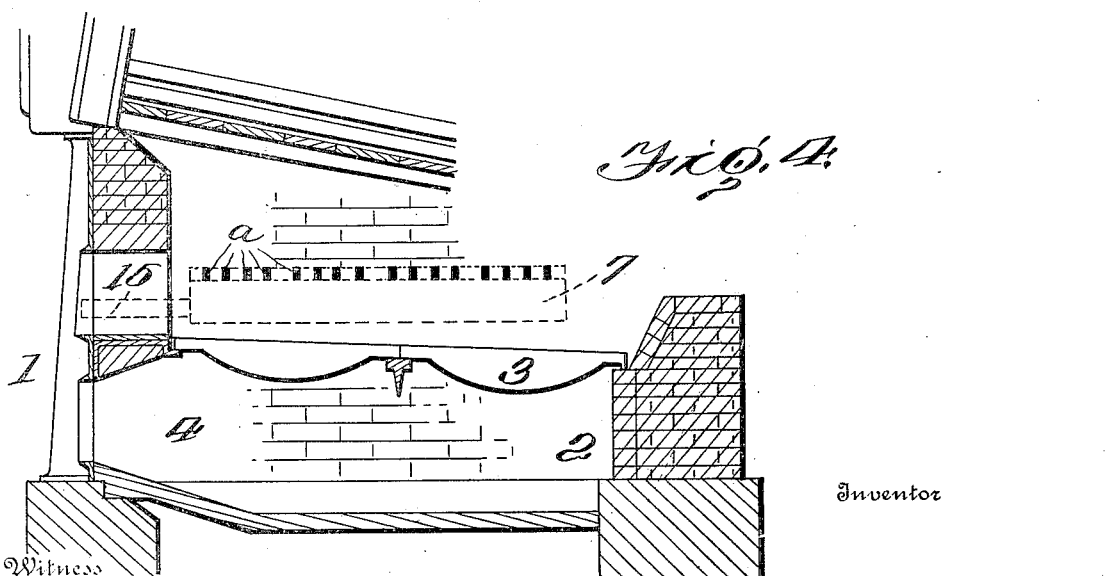

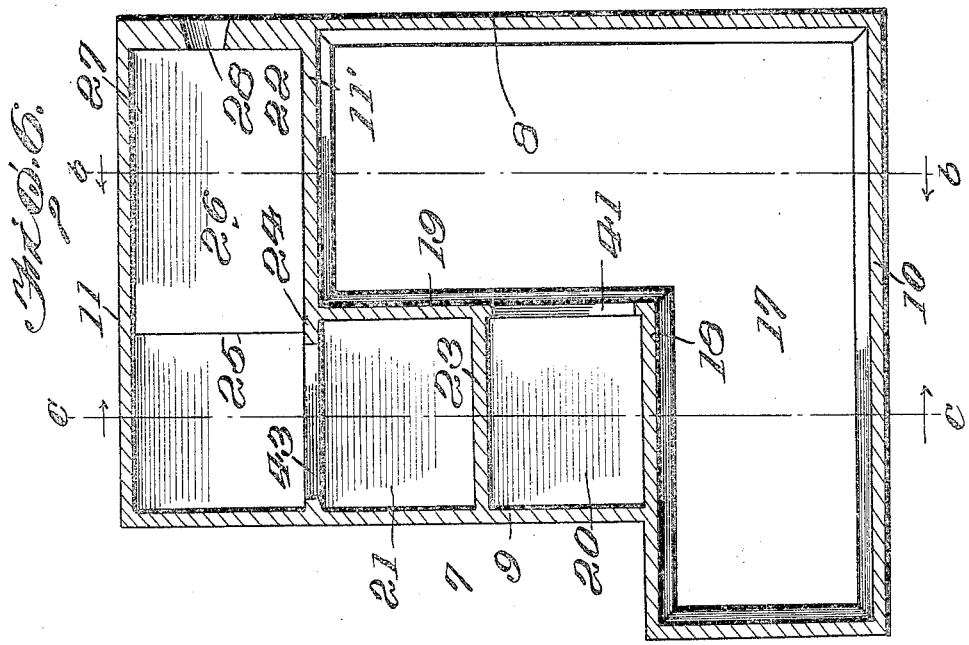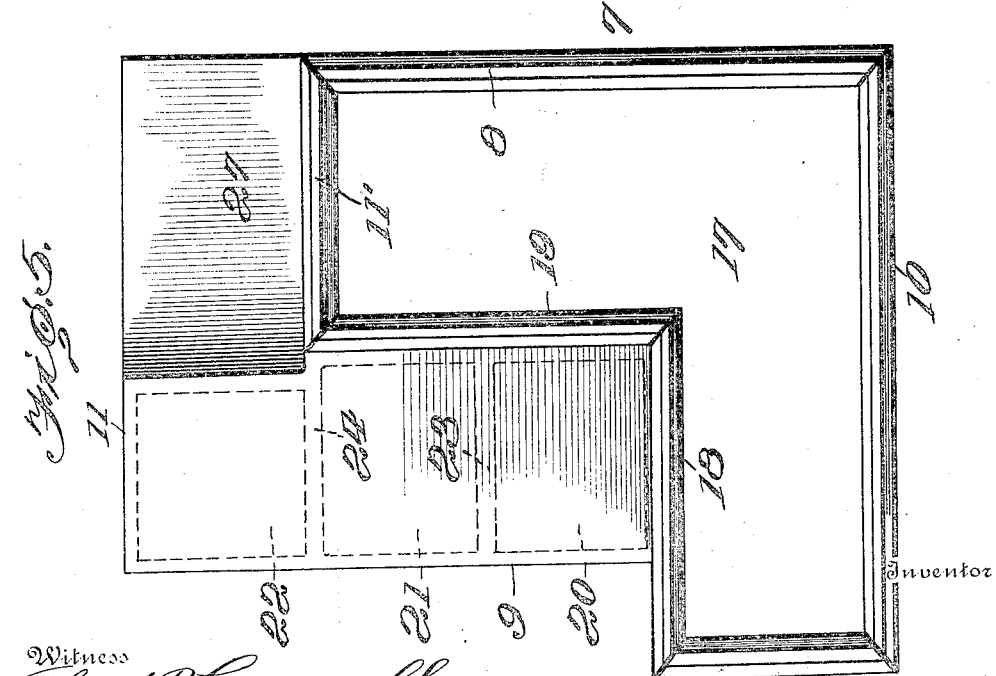

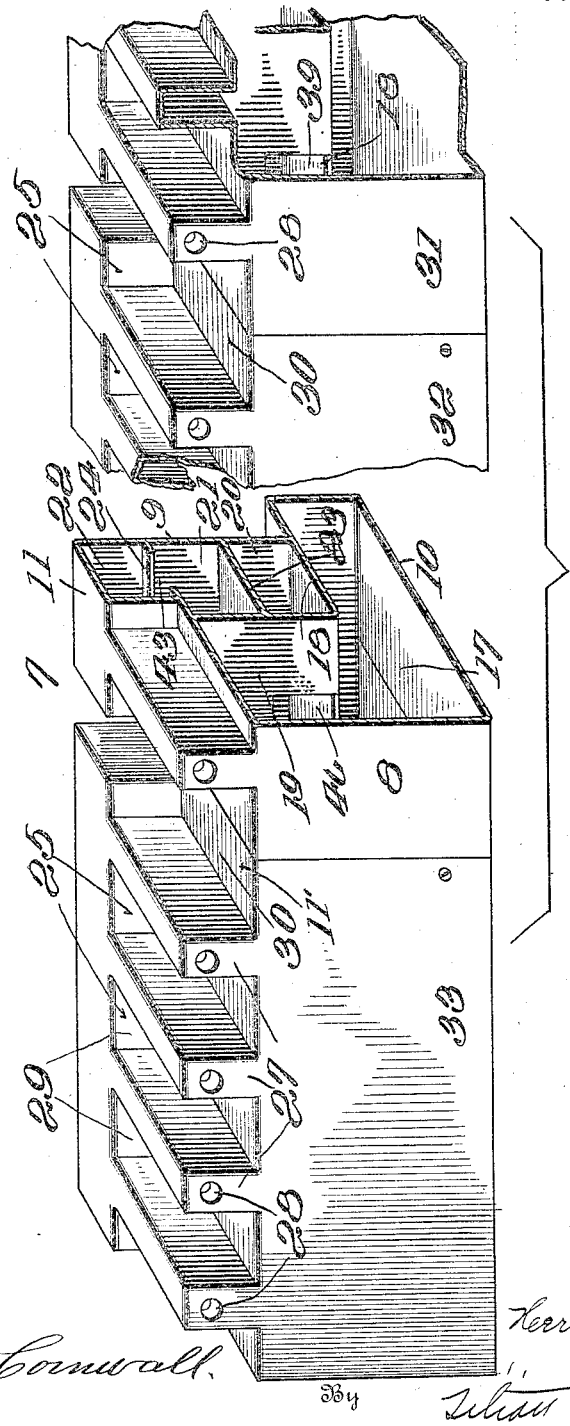

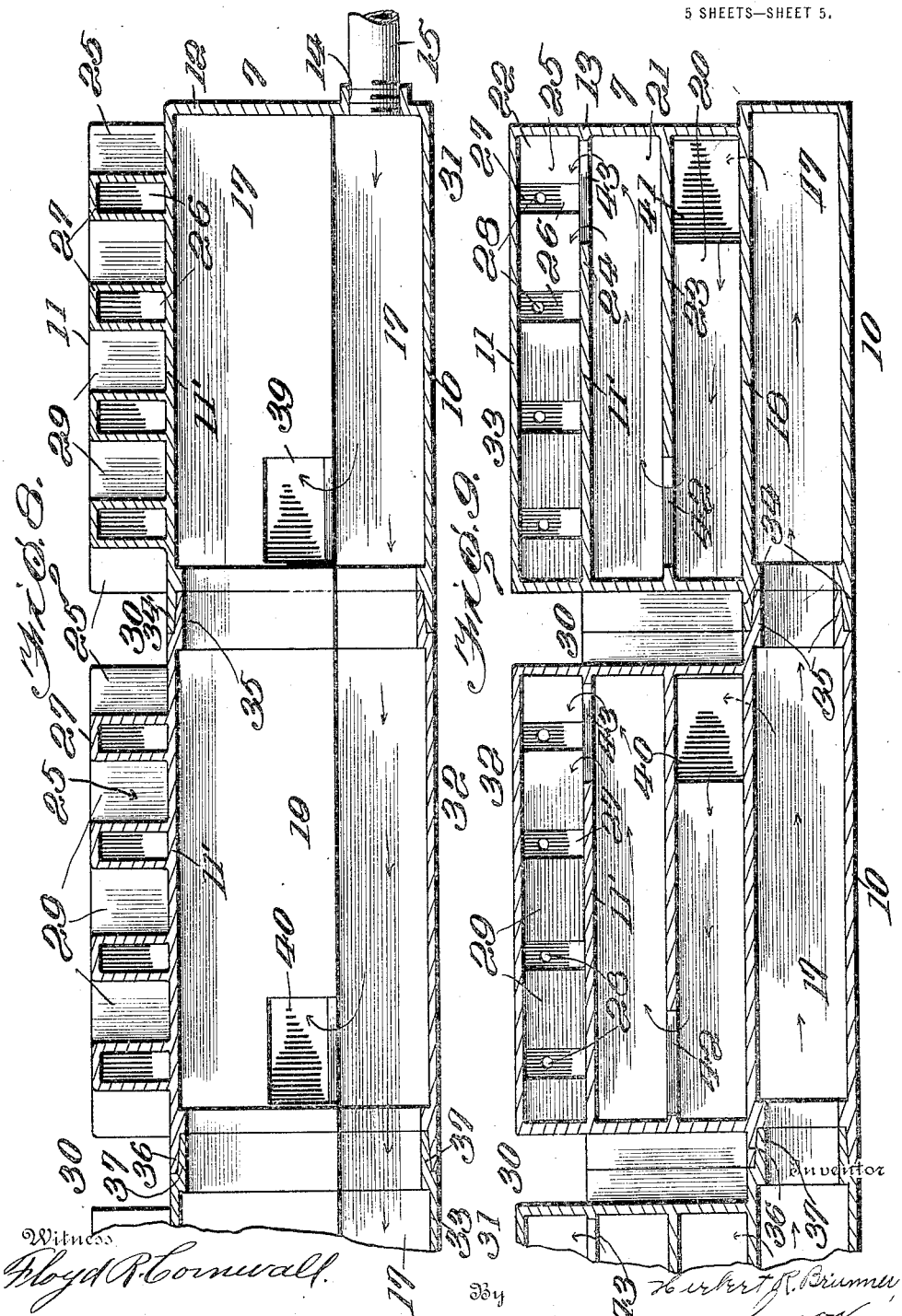

Patented Oct. 3, 1922.

1,430,936

UNITED STATES PATENT OFFICE.

HERBERT R. BRUNNER, OF NEW YORK, N. Y., ASSIGNOR, BY MESNE ASSIGNMENTS, TO VAN KANNEL REVOLVING DOOR COMPANY, OF NEW YORK, N. Y., A CORPORATION OF NEW JERSEY.

AIR-PREHEATING DEVICE FOR FURNACES.

Application filed June 5, 1918. Serial No. 238,359.

*To all whom it may concern:*

Be it known that I, HERBERT R. BRUNNER, a citizen of the United States, residing at New York, in the county of New York and State of New York, have invented certain new and useful Improvements in Air-Preheating Devices for Furnaces, of which the following is a specification.

This invention relates to improvements in an apparatus or device for preheating air for aiding combustion in furnaces and more particularly to such a device adapted for use in connection with the combustion chamber of a power boiler wherein it is set in the walls of the furnaces, and adapted to deliver preheated air to the combustion chamber of the furnace.

I have found that the way to increase the air flow is by enlarging the cross sectional area of the channels and to employ channels which, while having in common the feeding function of the air, are so proportioned and arranged with relation to each other, as to cause the device to functionate differently in some particulars in different parts of the device and in the preheater illustrated, and about to be described, in detail, I provide a large channel which is in effect, a reservoir or preheating chamber, in which the air is more nearly at a state of rest than the air in the other or feeding channels, which are in communication with the reservoir. The latter channels, I will term the "control channels," and between the various channels or chambers, both the large and relatively small, I arrange one hundred and eighty degree reversals, by which, and by reason of the attenuated character of the smaller channels, and the size of the transfer openings between them, I effect the proper control. In a relatively short channel of uniform size and of the capacity required in any instance, air in rapid motion would flow from one end of the channel to the other without having the heat from the heating surface penetrate the moving mass of air, as it is well understood that in connection with air or gas moving through a tube or channel, the mass in the center, under its motive power, whatever that may be, attains the highest velocity, which velocity is very much higher than that of the portion of air or gas adjacent to the surface of the channel, such latter air being a film moving at a comparatively low velocity compared with the central mass, and the success of an apparatus of this character depends upon adequately preheating the air and controlling its flow in transit to the combustion zone of the furnace, in such a way as to deliver under all conditions of load, a proper amount of adequately preheated air. Otherwise, as above suggested, the feeding of air through the furnace is just as apt, and more so, to be a detriment, than an advantage.

By the reversals referred to, retardation of the air is introduced in my invention, and by the use of relatively large reservoirs or chambers exposed to the heat from the fire in the furnace, the air is sufficiently preheated and an automatic control becomes a characteristic of the device, so that it will deliver the desired quantity of air under the minimum draft, and the quantity or amount will be increased under a slight increase in draft, but the retardation, due to the one hundred and eighty degree reversals, which I provide in the channels or at the points where the channels connect, will hold down the increase in air flow, to the maximum requirements under maximum drafts.

The primary object of this invention therefore, is to provide a structure in which the proper amount of adequately preheated air will be delivered to the combustion zone of the furnace, commensurate with the furnace requirements from the minimum to the maximum load, automatically, or without the necessity of manual manipulation of the device, to meet these requirements.

A further object of the invention is to construct an efficient device in units or separate sections which are complements of each other, so that a greater or less number of such units may be used in furnaces of varying capacities, and to make each section self-controlling or capable of a control within itself, regardless of the length of the fire box of the furnace, all as will appear in the following description.

I do not limit myself to the use of the device about to be described in connection with any particular furnace, or any particular part of a furnace, so long as it is so positioned as to get the benefit of the heat from the products of combustion in the furnace, except in so far as it will be obvious that the device is adapted for brick-set furnaces, whether for heating plants, or power boiler furnaces.

In the drawings illustrating my invention—

Figure 3 is a horizontal section taken about on the line a—a of Figure 2;

Figure 4 is a longitudinal section through the combustion chamber of a furnace, so much of the furnace wall being shown as is necessary to show the application of the preheater.

Figure 5 is an end elevation of one of the intermediate sections or units of the preheater;

Figure 6 is a transverse section of the same, taken through the various channels and chambers, and through one of the distributing spurs.

Figure 7 is a broken perspective view of the preheater showing several sections of the same in proper relation to each other.

Figure 8 is a longitudinal vertical section of the device taken about on line b—b of Figure 6, looking in the direction of the arrow.

Figure 9 is a similar view taken about on line c—c of Figure 6, looking in the opposite direction.

Figure 1:
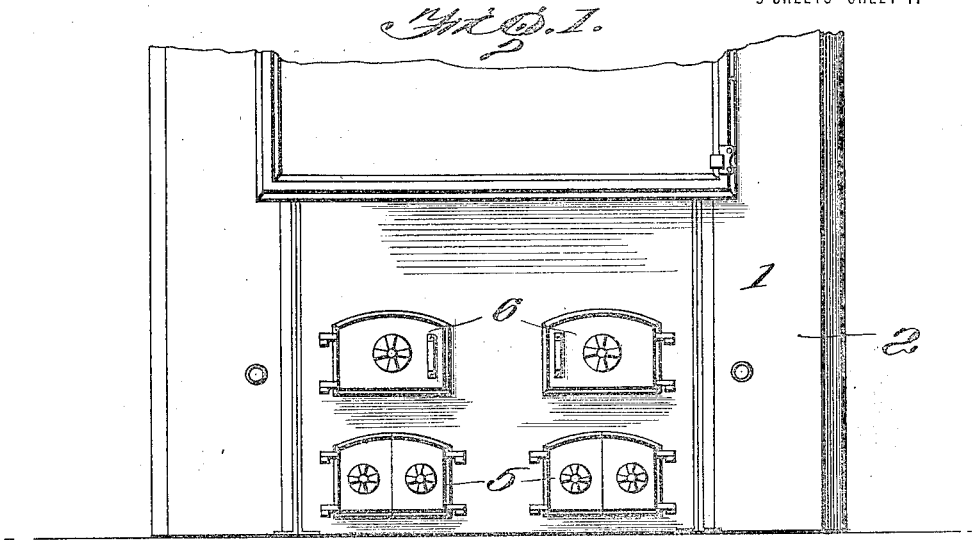
Figure 1 is a front view of a furnace with preheater applied.

Referring to the drawings, the numeral 1 designates a furnace, 2 the side walls thereof, 3 the grate, 4 the ash pit, 5 the ash pit door and 6 the fire door. It will be understood that the device in its present embodiment is applicable to all types or styles of brick set furnaces, which are, as will be also understood, provided with stack dampers not necessary to be shown or described in detail.

The numeral 7 designates the preheater as a whole. It is a metalic casing, formed of a plurality of units or sections which are in the main, duplicates of each other, the sections being adapted to be joined with each other, end to end, to form a continuous preheater of a length commensurate with the fire box of the furnace to which it is to be applied. It is well known that the fire boxes of furnaces vary in length and it is desirable to have the preheater extend on each side of the fire box for almost the entire length thereof. The casing is formed with side walls 8 and 9, bottom and top walls 10 and 11, respectively, the top wall being peculiarly formed or interrupted, for purposes that will presently appear. The casing also has front and rear end walls 12 and 13, respectively, the front wall being tapped as indicated at 14, for the reception of the inlet pipe 15, which leads to and through the front plate of the furnace, and having an open end, through which air is admitted to the preheater.

Figure 2:
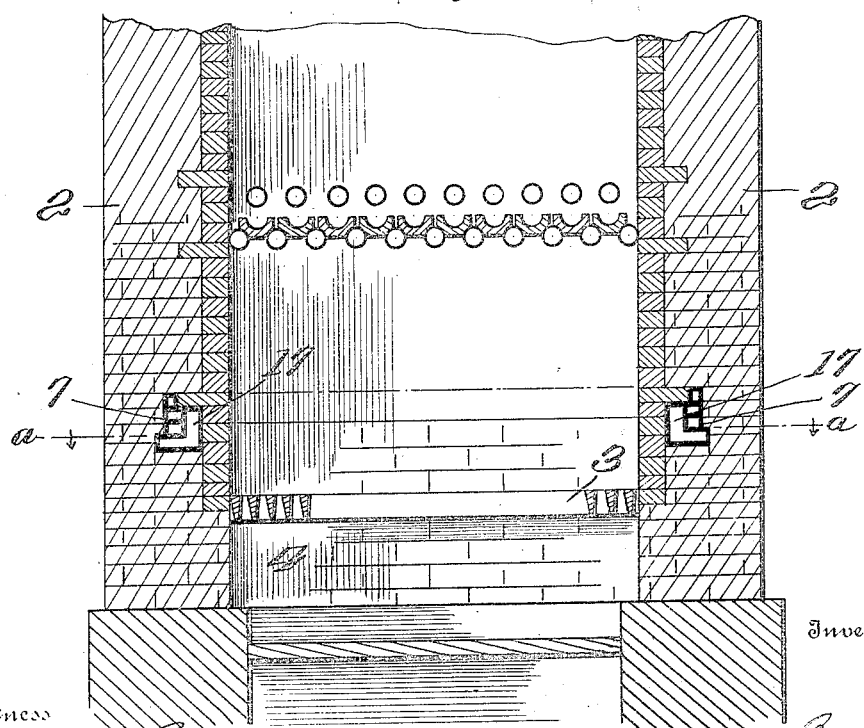
Figure 2 is a transverse section of the lower part of the furnace, showing the manner of building the device into the furnace walls.

The numeral 17 designates what I term the storage or reservoir channel, large in cross sectional area and of very considerable capacity, and this channel is in effect, the primary heating channel in which the movement of the air under furnace or draft conditions, both ash pit and stack, is comparatively slow, and the side of the casing, in installing the device, as shown in Figures 1, 2, 3 and 4, is placed so the greatest amount of heat is applied to the metal of the casing surrounding this channel, although it will be understood that the whole device is situated so as to become sufficiently heated, so as to heat adequately the air therein. The casing is placed in the furnace wall in such manner as will appear, as to protect it from the intense heat of the furnace, and thereby prevent injury to the casing. This chamber is formed by the bottom 10, the wall 8 and a portion of the top 11, and side 9 of the casing, and horizontal partition 18, vertical partition 19 and part 11' of the top of the casing. The numerals 20, 21 and 22, designate what I call the control channels which are attenuated, and are of very considerably smaller cross sectional area than the channel 17, and it is within these channels that I effect the control of the air flow. Each section or unit is provided with a series of these channels which are in communication with each other, through transfer openings within the partitions of each individual section, the reservoir channel 17, however, being common to all of the units. These channels 20, 21 and 22 are formed by one outer wall 9 of the casing, the vertical partition 19, a portion of the horizontal partition 18, a portion of the top of the casing, and horizontal partitions 23 and 24, there being also a partition 25 provided at intervals with distributing openings 26 communicating with distributing spurs 27, each provided with discharge openings 28. All of the walls and the distributing spurs of each section are cast integral with each other so as to more effectively communicate the heat from the metallic surfaces to the air within the casing. The spurs are separate and preferably each section or unit of the casing is provided with four distributing spurs, the space between the wall of the end spur, and the end of the section being about equal to the space between the spurs, so that when two sections are placed together, there will be formed a series of comparatively narrow spaces 29, and a comparatively wide space 30, the narrower spaces being adapted to receive a header brick and the wider space two bricks in building the device into a furnace.

I have illustrated two complete sections, and a portion of a third section, but, as previously stated, it will be understood that the device may be made in as many sections as the exigencies of installation may require. The numerals 31, 32 and 33 designate these sections, the section 31 being the front section, through which the air is introduced into the device.

The front section 31 is provided with a continuous angular flange 34 which overlaps a similar shouldered flange 35 of the intermediate unit 32. At the opposite end of section 32, shouldered flange 36 is provided which overlaps a similar flange 37 on an end of the section 33, all of the flanges being around that portion of the section ends that constitutes the end boundaries of the reservoir or storage channel 17.

The reservoir channel 17 is common to all of the units or sections that is to say, it supplies the air that circulates or flows through these individual sections and the control channels are in communication with the storage or reservoir channel, through a series of transfer openings, 39, 40, and 41, and the control channels 20 of the various units are in communication with the channels 21 above them, through transfer passages 42, and the channels 21 are in turn in communication with the channels 22, through similar transfer openings 43, through which last channels 22, the preheated air passes lengthwise of the unit or section of the casing, and through the various distributing spurs 27 in communication with said channel. The air flowing from the reservoir channel to the control channels will, it will be noted, be subjected to 180° reversals, and the air must travel entirely back and forth in the control channels in each individual unit, thus giving to the units the capacity for individual control. Hence any number of units or sections may be used in a given installation without varying the length of the control channels throughout the entire casing, which would be destructive of the control, in many instances.

I have found in practice that in a given apparatus or preheater, adapted to supply the required amount of adequately preheated air to the combustion zone of the furnace, at all stages of combustion from the minimum to the maximum load, that the cross sectional area and the length of the control channels, and the size of the transfer openings, is important, in connection with the sharp reversals of the air flow, through the units, and obviously in a case where a considerable number of units are required in the installation of a given preheater, the control would, to a great extent, be lost, were the channels 20, 21 and 22 in all of the units in lengthwise communication with each other, and to avoid this loss of control, and to make the control constant, and uniform, regardless of the number of sections or units employed, I provide the walls 38, confining the flow of air through the control channels to each individual unit, whereas, air is supplied to all of the control channels in all the units from the reservoir or storage channel 17.

In operation, the air is drawn into the reservoir channel 17 and moving slowly therein, becomes very highly heated, by reason of the opportunity afforded it in such channel, to come in all parts in contact with the highly heated metal surfaces, and under increased draft conditions, where a greater amount of preheated air is desired for aiding combustion, such additional air adequately preheated, will be caused to flow through the control channels and be sharply reversed, as described, and retarded by the reversals, so as not to supply an excessive amount of air, thus effecting what might properly be termed a static control.

The capacity of the reservoir is such that a sufficient amount of adequately preheated air is always on hand for use in the furnace, through the control channel. The manner of circulation or flow of air through the individual units or sections is identical, consequently a description of its passage through one unit will suffice for all, it being understood, as before stated, that the reservoir or storage channel 17 is common to each and feeds all of the units. The air passes in through the intake pipe 15, (reference is made to the section 32) through the transfer opening 40, into the channel 20, and passes the full lenth of the channel and then passes through the transfer opening 42, into the control channel 21, and through said channel to and through the transfer passage 43, meanwhile having been subjected to a sharp reversal or a 180° reversal, and into the control channel 22, wherein it is divided and passes laterally through the distributing spurs to and through the discharge openings 28, into the furnace, through the narrow opening $a$ between the header bricks, the air passing out of the distributing spurs being divided and subjected to such retardation as the 90° angles of said spurs makes necessary.

The end of the pipe 15, as before stated, outside the furnace is open, the pipe serving to supply air to the storage reservoir or channel. No damper or other adjustable device is necessary in connection with the intake and no manual manipulation is required for the reason that the control is in the apparatus itself, which control I term static control, whereby the proper amount of adequately preheated air is supplied to the combustion chamber of the furnace, at all stages of combustion from the minimum to the maximum load.

In the actual device, I preferably make the control channels about sixteen inches long in each unit or section, and the cross sectional area of the channels 20 and 21 is about five and one-half square inches, and the top channel or channel 22 is slightly less in cross sectional area, or about four square inches and each of the various transfer openings between the reservoir and control channels is approximately five and one-half square inches in area, whereas the total cross sectional area of the storage or reservoir channel is about forty-three and one-half square inches, and since the reservoir channel is as stated, common to all of the units, its length will be governed by the number of sections or units employed in a particular installation and in practice, this number seldom, if ever, exceeds six units in order to extend virtually the entire length of the combustion chamber.

It will be noted that aside from the reversals in flow of air, which take place in the control channels, the air is subjected to other or ninety degree reversals in flowing through the distributing spurs, to the discharge openings therein.

Having thus fully described my invention, what I claim is:

1. In combination with a furnace and with the draft apparatus thereof, an air preheater for aiding combustion located in the wall of the furnace and comprising a casing having a relatively large longitudinal passage therein, and a plurality of relatively small channels communicating with a reservoir channel, the channels being formed by the walls of the casing and partitions within the casing, the communication between the relatively small channels being so arranged that sharp reversals in the direction of the flow of air will be caused to retard the air flow under increased draft conditions.

2. In combination with a furnace and with the draft apparatus thereof, a preheating device in the wall of the furnace and comprising a metallic casing having a relatively large longitudinal reservoir channel extending throughout its length, and a plurality of relatively small air control channels in communication with the storage channel, and with each other, the channels being formed by the walls of the casing and partitions therein, the communication between the small channels being such that the air passing through will be subjected to sharp reversals, and means for supplying air from the outside of the furnace to the reservoir channel, and means for delivering air from one of the relatively small control channels to the combustion chamber of the furnace.

3. In combination with a furnace and with the draft apparatus thereof, an air preheating device in the wall of the furnace, comprising a metallic casing having a relatively large reservoir passage arranged at the side of the casing adjacent to the combustion chamber of the furnace, and having a plurality of relatively small control passages separated from each other, and each in communication with the reservoir passage, and with each other, the channels being formed by the walls of the casing and partitions therein, means for supplying air from the outside of the furnace to the reservoir passage, and means for delivering the air from one of the small channels of each control passage to the combustion zone of the furnace.

4. A preheater, comprising a casing having inlet and discharge openings, and formed of a plurality of sections adapted to join with each other, each section provided with partitions which, with the walls of the casing, form control channels of comparatively small cross sectional area in communication with each other in series in each section, and a reservoir or storage passage of cross sectional area greater than the first mentioned channels, and common to all of the channels in all of the sections.

5. A preheater, comprising a casing having inlet and discharge openings, and formed of a plurality of units or sections adapted to join with each other, and having vertical and horizontal partitions therein which, with the walls of the casing form a plurality of channels of comparatively small cross sectional area, said channels being in communication with each other, in each unit, through transverse openings located at opposite ends of the channels so that air flowing through the channels will be reversed and caused to pass the full length of the channels, and a reservoir or storage passage common to all of the first mentioned channels, and a wall separating the small channels in each section, whereby the air is caused to pass back and forth in each section, before reaching the discharge opening.

6. In a preheating appliance for furnaces, a casing consisting of exterior and interior walls and partitions defining a longitudinal storage passage of large cross section, and a plurality of independent, tortuous, continuous control passages of relatively small cross-section, each leading from the storage passage to a discharge orifice directed transversely of the casing, and each control passage comprising sharp reversals of direction; the casing being adapted to be placed in a furnace wall adjacent to the grate, with means for supplying external air to one end of the storage passage.

7. An element for air preheating and supply appliance for furnaces, consisting of a casing comprising exterior walls and interior partitions defining a longitudinal storage and preheating passage of angular and relatively large cross-section, a continuous, tortuous, control passage of relatively small cross-section, composed of a plurality of parallel channels arranged in series, certain of the channels lying in the angle of the storage passage, and one of them being located in a part of the casing extending above the top of the storage passage, the last named channel having discharge orifices directed transversely of the casing, the casing being adapted to be joined to similar ones to form a continuous appliance of variable length.

In testimony whereof I affix my signature in presence of two witnesses.

HERBERT R. BRUNNER.

Witnesses:
 FRANK G. BRERETON,
 TITIAN W. JOHNSON.